United States Patent [19]

Norman

[11] 3,763,315

[45] Oct. 2, 1973

[54] BLANKING CIRCUITS FOR TELEVISION RECEIVERS

[75] Inventor: Marvin Neil Norman, Indianapolis, Ind.

[73] Assignee: RCA Corporation, New York, N.Y.

[22] Filed: July 22, 1971

[21] Appl. No.: 165,099

[52] U.S. Cl. .............................................. 178/7.5 R

[51] Int. Cl. .............................................. H04n 5/44

[58] Field of Search .................... 178/7.3 R, 7.3 DC, 178/7.5 R, 7.5 DC

[56] References Cited

UNITED STATES PATENTS

| | | | |
|---|---|---|---|
| 2,607,847 | 8/1952 | Heisig | 178/7.5 R |
| 3,492,414 | 1/1970 | Chua et al. | 178/7.5 DC |

*Primary Examiner*—Robert L. Griffin
*Assistant Examiner*—George G. Stellar
*Attorney*—Eugene M. Whitacre

[57] ABSTRACT

There is disclosed a blanking circuit utilizing a transistor having its emitter electrode coupled to a point of reference potential and its collector electrode coupled to a point in the video amplifier. The base electrode is responsive to a signal developed only during retrace time by means of a current flowing through a discharge device associated with a deflection oscillator. The base electrode of the transistor is forward biased by this retrace signal to thereby saturate the collector to emitter path of the transistor and cause the video amplifier to produce a signal capable of blanking a kinescope employed in said receiver.

6 Claims, 1 Drawing Figure

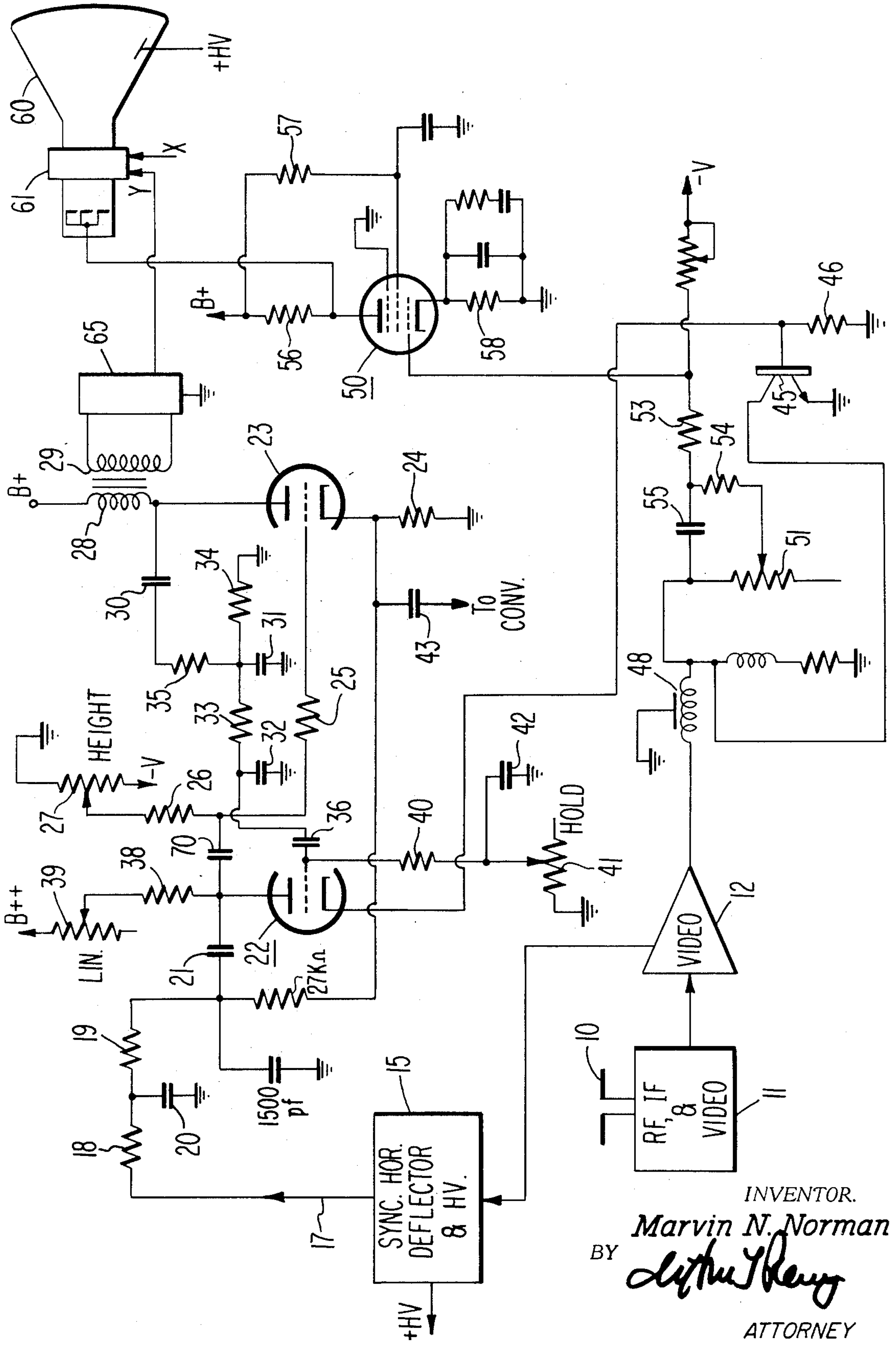
INVENTOR.
Marvin N. Norman
BY
ATTORNEY

BLANKING CIRCUITS FOR TELEVISION RECEIVERS

This invention relates to television receivers and, in particular, to retrace blanking circuits for use in such receivers.

Blanking circuits are employed to turn off or blank a deflection beam of a television receiver kinescope during retrace periods of the beam. If the deflection beam is not suppressed during its retrace movement, retrace lines will appear on the screen of the kinescope. These lines appear as white or colored diagonal lines across the raster in the case of vertical blanking. To minimize the possibility of retrace lines, it has been the conventional practice to employ a retrace suppression circuit. Such circuits utilize the flyback pulses from the vertical or horizontal deflection circuits as suppression pulses. In the vertical deflection circuit, for example, a composite voltage is produced by the circuit having a saw tooth (scan) component and a pulse (flyback or retrace) component.

As indicated, there are a number of circuits which exist in the prior art which are utilized to perform horizontal or vertical blanking. The difficulty with many of these circuits is that they require an additional winding, on the associated transformer, for obtaining the suitable flyback pulse. The provision of such a winding adds substantial expense to the receiver and requires additional shaping circuitry due to the limited response of the transformer.

Other approaches utilize diodes or rectifiers which may be connected in series with the video information signal path and which may be pulsed off during blanking to thereby open the video signal path. Still other configurations utilizing rectifiers require relatively large magnitude blanking pulses which are difficult to obtain from conventional deflection circuits.

Accordingly, it is an object of the present invention to provide an improved circuit for obtaining retrace blanking of the picture tube of a television receiver.

In accordance with the invention, blanking is provided in a television receiver by connecting the collector of a transistor to the video amplifier. The emitter of the transistor is connected to a point of reference potential. A typical deflection circuit comprises two active devices, one of which conducts only during the retrace interval. Means are coupled to this active device to provide a pulse during the retrace interval. This pulse is applied to the base electrode of the transistor and serves to cause the collector to emitter path impedance to revert to a low impedance state, thereby grounding the point in the video amplifier to cause the amplifier to provide a pulse of a sufficient magnitude to blank the kinescope.

The invention itself, both as to its organization and method of operation, will best be understood when read in conjunction with the accompanying FIGURE, which is a simplified schematic diagram of a portion of a television receiver including a blanking circuit embodying thhe present invention.

Referring now to the drawing, there is shown an antenna 10 which is capable of responding to transmitted radio frequency television signals and for applying the same to conventional front end circuitry 11 of a television receiver. Circuitry 11 includes the radio frequency amplifier, intermediate frequency amplifier, and a video detector. An output of the video detector is conventionally applied to a video amplifier 12. The video amplifier 12 may comprise the luminance amplifier of a color television receiver. The detected video is also conventionally applied to sync, horizontal deflection and high voltage circuitry 15.

The purpose of the sync separator, as is known, is to "strip" the synchronizing components from the ocmposite signal and to thereafter apply the same to suitable horizontal and vertical deflection circuits in order to provide a stable raster on the face of the kinescope. High voltages for the television receiver's picture tube are usually provided from the horizontal circuit by means of rectifying the flyback pulses and so on. Such techniques for producing high voltages to properly operate the kinescope are known in the art and not considered part of this invention.

The output of the sync separator, which in this example provides the vertical synchronizing components, is applied to a vertical deflection circuit. Therefore, the vertical synchronizing output lead 17 is shown coupled to an integrator circuit comprising resistors 18 and 19. The junction between the resistors is shunted to ground by means of a capacitor 20. A terminal of resistor 19 is coupled through a capacitor 21 to the plate electrode of a vacuum tube 22.

Basically, a typical vertical deflection oscillator comprises a first active device or vacuum tube 23 and a second active device or vacuum tube 22. The vacuum tubes 22 and 23 form an oscillator circuit which operates as follows.

Initially, the vacuum tube 23 is conductive. The biasing for vacuum tube 23 is obtained via resistors 25, 26 and 27 which couple the grid electrode of vacuum tube 23 to a suitable source of biasing potential designated as −V. Resistor 27 is a potentiometer and can be varied to control the quiescent operating point of vacuum tube 23 to thereby control the effective height or amplitude of the saw tooth wave provided. The anode electrode of vacuum tube 23 is coupled through a primary winding 28 of a vertical deflection transformer to a source of potential.

The cathode electrode of tube 23 is coupled to ground via a resistor 24 bypassed by a capacitor 43 to a low impedance convergence circuit (not shown). The plate electrode of vacuum tube 23 is further AC coupled to the grid electrode of vacuum tube 22 via a suitable shaping or integrating network including capacitors 30, 31 and 32, which are suitably coupled in a pi-filter arrangement by means of resistors 33, 34 and 35. The output of the network is coupled to the grid electrode of vacuum tube 22 by means of a further capacitor 36.

The vacuum tube 22, as indicad above, has sync applied to its plate electrode via capacitor 21. The plate electrode is further coupled to a source of operating potential via resistors 38 and 39. Resistor 39 is a potentiometer and can be adjusted and set to improve linearity of the charging wave shape during the scan interval of the vertical deflection circuit.

The grid electrode of tube 22 is further coupled to a HOLD circuit via the grid leak resistor 40 and potentiometer 41. The junction between the variable arm of potentiometer 41 and resistor 40 is bypassed to ground by means of a capacitor 42. The function of the HOLD circuit is to assure that the injected sync pulse at the plate electrode of vacuum tube 22 is effective to terminate the scan period of the vertical deflection oscillator.

In prior art receivers utilizing a similar oscillator configuration as described above, the cathode electrode of vacuum tube 22 was returned to ground either directly or through a small resistor. In this embodiment the cathode electrode is coupled to the base electrode of a transistor 45 having a resistor 46 coupled between the base electrode and a point of reference potential. Therefore, the current return path for vacuum tube 22 is via resistor 46, which is in shunt with the base to emitter path of transistor 45. The emitter electrode of transistor 45 is coupled to a point of reference potential such as ground.

The collector electrode of transistor 45 is coupled to a point in the video amplifier chain. For example, the output of video amplifier 12 is conventionally utilized to drive a delay line 48, which is used to delay the luminance components with respect to the chrominance components so that they arrive at the respective electrodes of the kinescope relatively simultaneously. The output of the delay line 48 is DC coupled to the input or grid electrode of the video driver stage 50 including a pentode vacuum tube device.

The DC coupling path is provided via resistors 51, 53 and 54. Resistor 51 is a potentiometer having its variable arm coupled via a resistor 54 to a terminal of resistor 53. Resistors 51, and 54 are bypassed by means of capacitor 55 in a known manner to permit both AC and DC coupling within the video amplifier chain. The potentiometer 51 serves as a brightness control and its function, as such, is known in the art.

The video driver 50 is utilized as an output stage and has its plate electrode directly coupled to the cathode electrodes of the kinescope 60. B+ is supplied to the plate electrode via a video load resistor 56. The screen voltage for the pentode is supplied via a screen resistor 57 and the cathode of the pentode is conventionally returned to ground through a resistor 58 in shunt with some suitable high frequency peaking circuitry. Basically, the entire video chain after the video detector is DC coupled so that the kinescope may respond to the DC component of the detected video signal.

The vertical and horizontal deflection circuits are coupled to a yoke 61 associated with the kinescope for driving the same. Therefore, there is schematically shown two inputs to the yoke 61, one designated as X to reference horizontal deflection, and the other designated as Y to reference vertical deflection. The vertical deflection wave shape or saw tooth is obtained from the above-noted vertical oscillator by coupling the primary winding 28 of the vertical deflection transformer to a secondary winding 29 and thence through suitable coupling means 65 to the yoke.

The operation of the above-noted circuit will now be explained. The vertical oscillator, comprising the active devices or vacuum tubes 22 and 23, is a free-running, discharge type oscillator. Operation of the oscillator is as follows. Initially, there is no charge across capacitor 21 which is the timing capacitor. When the receiver or the power supply is turned on, capacitor 21 begins to charge towards B++ via resistors 38 and 39.

Initially, vacuum tube 22 is nonconductive because of the biasing on its grid electrode and vacuum tube 23 is conductive. As capacitor 21 begins to charge towards B++, this positive transition is coupled via capacitor 70 to the grid electrode of vacuum tube 23. This cause vacuum tube 23 to provide at its plate electrode a saw tooth of opposite polarity, or one in the negative direction.

The negative transition provided at the plate electrode of vacuum tube 23 is in turn coupled to the grid electrode of vacuum tube 22, thus assuring that vacuum tube 22 remains cut off.

After an appropriate interval, a sync pulse will appear at the plate electrode of vacuum tube 22 and is applied thereto in a negative direction. This negative pulse is coupled via capacitor 70 to the grid electrode of vacuum tube 23 and is in a direction to cut off current conduction of vacuum tube 23. This causes the plate of vacuum tube 23 to go positive.

This positive transition is thence coupled to the grid electrode of vacuum tube 22, which is rendered conductive. As soon as vacuum tube 22 begins to conduct, the plate voltage falls toward reference potential. This negative transition is again applied to the grid of vacuum tube 23 driving the same further into cut off. This pulse then attempts to cut off vacuum tube 23. Since the current through the inductor 28 cannot change instantaneously, a large voltage spike is produced at the plate electrode of vacuum tube 23, thereby turning on vacuum tube 22 even harder. This regenerative action thus assures a very rapid discharge time once the sync pulse has initiated the cycle. It is again noted that vacuum tube 22 only conducts current during this retrace interval initiated by the sync pulse.

Therefore, a positive voltage is developed across resistor 46, which is in series with the cathode electrode of vacuum tube 22. This positive voltage is applied to the base electrode of transistor 45, which therefore becomes conductive during and only during the retrace interval. The collector to emitter path of transistor 45 becomes saturated, thereby in effect grounding the grid electrode of tube 50 or shorting the video line to ground. This in effect produces a negative pulse at the grid electrode of vacuum tube 50 of a magnitude sufficient to drive vacuum tube 50 to cut off. Therefore, a large positive pulse is produced at the plate electrode of vacuum tube 50 which positive pulse therefore serves to cut off the kinescope because of its application to the cathode electrodes.

The above-noted blanking scheme, as indicated, eliminates the need for any additional windings on the vertical transformer. Furthermore, the blanking circuit directly follows the blanking interval since vacuum tube 22 is only conductive during that interval and therefore the duration of the blanking pulse is always correct and therefore always sufficient to provide retrace blanking for the entire retrace interval.

The circuit only utilizes two additional components which are, namely, the transistor 45 and the resistor 46. Due to the fact that transistor 45 is always operated at low potentials, it can be a relatively inexpensive device and still provide reliable blanking operation.

Furthermore, since transistor 45 is a gain device, one can tolerate fairly large variations in vacuum tube characteristics used in the deflection circuit and so on, and still obtain reliable blanking.

The above circuit operated satisfactorily in a television receiver employing a 2N3692 as transistor 45, which transistor had a 1,000 ohm resistor 46 coupled between its base electrode and ground. The vertical deflection circuit shown utilized the following components:

| | | |
|---|---|---|
| Vacuum tube | 22 | ½ 13GF7 |
| | 23 | ½ 13GF7 |
| Capacitor | 20 | 1,000 picofarads |
| | 21 | 0.033 microfarads |
| | 30 | 0.0082 microfarads |
| | 31 | 1,000 picofarads |
| | 32 | 1,000 picofarads |
| | 36 | 0.0056 microfarads |
| | 42 | 0.01 microfarads |
| | 70 | 0.1 microfarads |
| Resistor | 18 | 47,000 ohms |
| | 19 | 82,000 ohms |
| | 24 | 820 ohms |
| | 25 | 1,000 ohms |
| | 26 | 1.5 M ohms |
| | 27 | 1 M ohm |
| | 33 | 47,000 ohms |
| | 35 | 120,000 ohms |
| | 38 | 1.5 M ohms |
| | 39 | 3.5 M ohms |
| | 40 | 220,000 ohms |
| | 41 | 900,000 ohms |
| | 46 | 1,000 ohms |

What is claimed is:

1. In a television receiver of the type employing a kinescope having an electron beam and a circuit for deflecting said beam in one of two mutally perpendicular directions, said deflection circuit being of the type including a first, normally conductive active device and a second, normally non-conductive active device coupled in an oscillator configuration for producing a sweep wave form having a relatively long charge time determined by the conduction of said first active device and a relatively fast discharge time determined by the conduction of said second active device, said normally conductive first device being rendered non-conductive and said normally non-conductive second device being rendered conductive in response to a synchronizing signal applied during a retrace interval associated with said deflection circuit, in combination therewith apparatus for providing a blanking signal during said retrace interval, comprising:

a. first means serially coupled in the current path of said second active device and responsive to its current flow during the conductive state thereof for providing a control signal indicative of the occurrence of said retrace interval, b. a third active device having an input electrode coupled to receive said control signal, a common electrode coupled to a point of reference potential and an output electrode, said third device being responsive to the application of said control signal to present a low impedance between its output and common electrodes during said retrace interval, and c. second means coupling the output electrode of said third active device to said kinescope to change the bias thereon and cause the electron beam of said kinescope to cut off during said interval.

2. A blanking circuit for a television receiver including an amplifier direct coupled to a kinescope producing an electron beam, said amplifier including a plurality of stages and said receiver including deflection wave form generating apparatus for producing a deflection wave form having a relatively long scanning interval determined by the conduction of an included first, normally conductive active device and a relatively short retrace interval determined by the conduction of an included second, normally non-conductive active device, with said first and second active devices being arranged in an oscillator configuration, the frequency of which is controlled by the charging rate of a timing capacitor coupled to discharge through the second of said active devices in response to the application of a synchronizing signal applied during said retrace interval to render said normally conductive first device non-conductive and to render said normally non-conductive second device conductive, comprising in combination:

a. means serially coupled in the current path of said second active device and responsive to its current flow during the conductive state thereof for producing a pulse output during said retrace interval, and b. a transistor having base, collector and emitter electrodes, said emitter electrode being coupled to a source of reference potential, said collector electrode being coupled to said amplifier, and said base electrode being coupled to said means and responsive to the occurrence of said pulse to cause said transistor to saturate and thereby provide a low impedance between its collector and emitter electrodes, to alter both the bias on said amplifier and the bias on said kinescope in a direction to cut off the electron beam of said kinescope during said retrace interval.

3. The blanking circuit of claim 2 wherein the discharge current path for said timing capacitor is through said second active device and partly through the base to emitter electrode path of said transistor.

4. The blanking circuit according to claim 2 wherein said means serially coupled in series with said second active device includes a resistor.

5. The blanking circuit according to claim 2 wherein said active devices are vacuum tubes and said transistor is an NPN transistor.

6. The blanking circuit according to claim 2 wherein said retrace interval is the vertical retrace interval of an applied television signal.

* * * * *